N. SMITH.
Scoops.

No. 150,093. Patented April 21, 1874.

WITNESSES:
P. C. Dieterich
D. Kiesecker

INVENTOR.
Nicholas Smith
per J. H. Alexander
ATTORNEY.

UNITED STATES PATENT OFFICE.

NICHOLAS SMITH, OF DELPHI, INDIANA.

IMPROVEMENT IN SCOOPS.

Specification forming part of Letters Patent No. 150,093, dated April 21, 1874; application filed February 26, 1874.

*To all whom it may concern:*

Be it known that I, N. SMITH, of Delphi, Carroll county and State of Indiana, have invented new and useful Improvements in Scoops; and I do hereby declare that the following is a full, clear, and exact description thereof, reference being had to the accompanying drawings, and to the letters of reference marked thereon, which forms part of this specification:

The nature of my invention consists in the construction and mode of manufacturing a scoop for grocer's use, as will be hereinafter more fully set forth.

In order to enable others skilled in the art to which my invention appertains to make and use the same, I will now proceed to describe its construction and operation, referring to the annexed drawing, in which—

Figure 1:
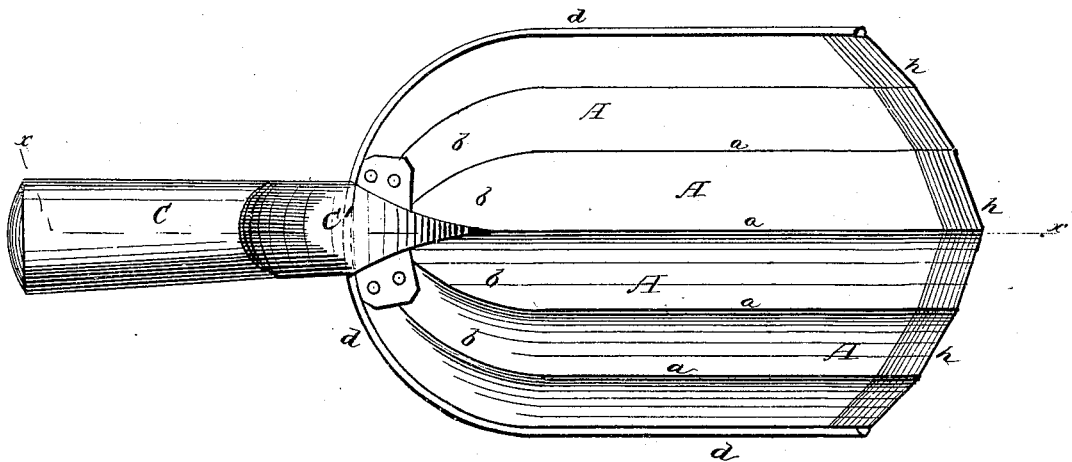
Figure 2:
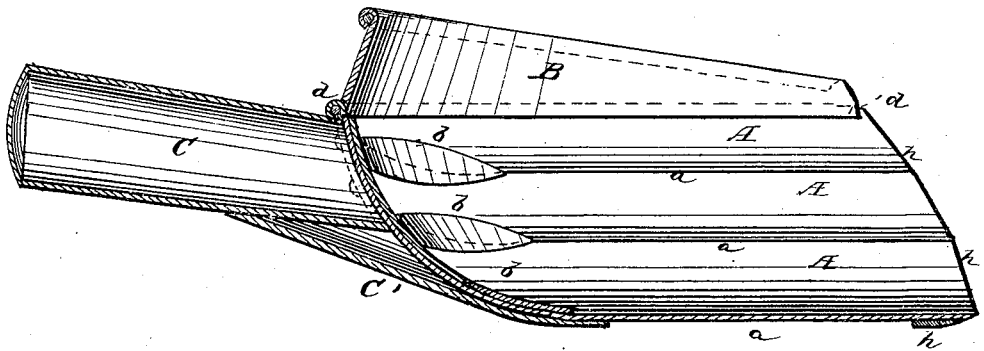

Figure 1 is a bottom view, and Fig. 2 is a longitudinal section of my scoop.

My scoop is made of a piece of sheet metal by striking a sufficient number of angles, $a\ a$, to produce the circular form. The flat strips A A, or spaces between the angles $a\ a$, have their inner ends terminating in conical or wedge-shaped points $b\ b$, which being properly formed and soldered together, produces the curvature at the back, and thereby gives great strength, and makes a handsome scoop. The upper edge of the scoop is strengthened by means of a wire, $d$, the edge of the metal being bent over said wire. To the upper edge of the scoop is attached a lip or extension, B, extending all around the scoop to give it the proper capacity. C represents the handle with a brace, C', soldered to the bottom of the scoop. The handle C is fastened to the back of the scoop by being riveted to it around three-fourths of the circumference of the handle, the metal of the upper one-fourth of the handle passing under the wire, and is turned over the same back onto the handle, which makes it perfectly rigid, strong, and durable. The front or cutting edge of the scoop is strengthened by means of a strip, $h$, of highly-tempered steel, which not only strengthens the scoop, but also makes it more durable, as it prevents the edge from wearing out so soon.

Having thus fully described my invention, what I claim as new, and desire to secure by Letters Patent, is—

1. The scoop A constructed with angles $a\ a$, and strengthened by points $b\ b$, substantially as and for the purpose set forth.

2. The combination, with a scoop, A, and handle C, of brace C', and wire $d$, as and for the purpose set forth.

In testimony that I claim the foregoing as my own I affix my signature in presence of two witnesses.

NICHOLAS SMITH.

Witnesses:
M. R. GRAHAM,
EDWARD BEACH.